Figure 1:
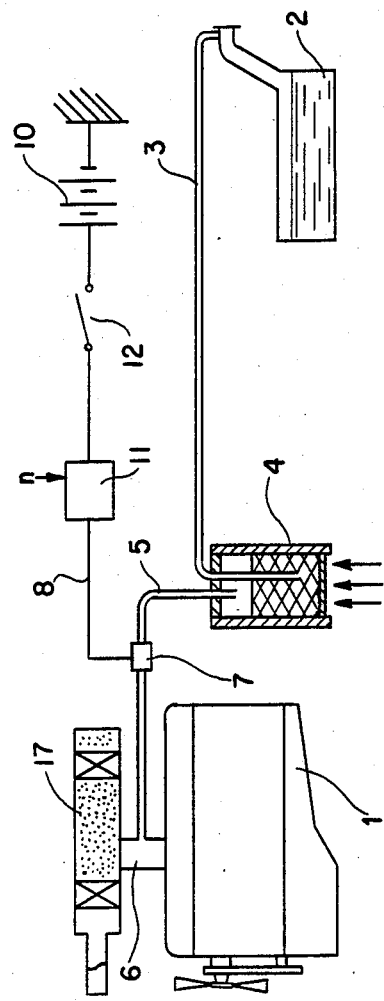

United States Patent [19]
Brand

[11] Patent Number: 4,658,797
[45] Date of Patent: Apr. 21, 1987

[54] VENTILATION DEVICE FOR THE FUEL TANK OF A MOTOR VEHICLE

[75] Inventor: Martin Brand, Ingolstadt, Fed. Rep. of Germany

[73] Assignee: Audi AG, Fed. Rep. of Germany

[21] Appl. No.: 683,863

[22] Filed: Dec. 20, 1984

[30] Foreign Application Priority Data

Dec. 21, 1983 [DE] Fed. Rep. of Germany ....... 3346103

[51] Int. Cl.[4] ............................................. F02M 39/00
[52] U.S. Cl. .................................... 123/520; 123/458; 123/516
[58] Field of Search ............... 123/516, 518, 519, 520, 123/521, 458

[56] References Cited

U.S. PATENT DOCUMENTS

| | | | |
|---|---|---|---|
| 3,680,318 | 8/1972 | Nakajima | 123/519 |
| 3,690,307 | 9/1972 | O'Neill | 123/520 |
| 4,013,054 | 3/1977 | Balsley | 123/519 |
| 4,343,281 | 8/1982 | Vozumi | 123/520 |
| 4,377,142 | 3/1983 | Otsuka | 123/520 |
| 4,467,769 | 8/1984 | Matsumura | 123/520 |
| 4,475,507 | 10/1984 | Miyaki | 123/458 |
| 4,527,532 | 7/1985 | Kasai | 123/520 |

FOREIGN PATENT DOCUMENTS

| | | | |
|---|---|---|---|
| 0041443 | 3/1982 | Japan | 123/520 |
| 0086555 | 5/1982 | Japan | 123/519 |
| 0077156 | 5/1983 | Japan | 123/519 |
| 0131343 | 8/1983 | Japan | 123/519 |
| 0213941 | 12/1984 | Japan | 123/520 |

OTHER PUBLICATIONS

Research Disclosure No. 17419, Disclosed Anonymously, "Vapor Purge Control", Oct. 1978.

Primary Examiner—Carl Stuart Miller
Attorney, Agent, or Firm—Kane, Dalsimer, Kane, Sullivan and Kurucz

[57] ABSTRACT

A ventilation device for the fuel tank of a motor vehicle is provided with ventilation line (3) which connects the tank with the atmosphere by means of a fuel vapor filter. For regenerating purposes, the filter 4 is connected to the intake system 6 of the vehicle combustion engine 1 by means of a filter exhaust line (5), so that air is taken in through filter 4 when the combustion engine 1 is in operation and thereby the fuel accummulated in the filter is removed. In order to prevent the collection of fuel vapors in the intake system 6 when the combustion engine is not in operation and in particular to prevent the enrichment of the fuel-air mixture through the exhaust line while the combustion engine is off, a valve 7 is provided in the exhaust line 5 which is closed when the combustion engine 1 is off and which opens the exhaust line 5 increasingly in accordance with the increased rotational speed, so that only a low amount is suctioned at a low rotational speed, but at a certain rotational speed sufficient air is taken in through the filter 4 thereby effectively regenerating the same.

1 Claim, 2 Drawing Figures

VENTILATION DEVICE FOR THE FUEL TANK OF A MOTOR VEHICLE

The invention relates to a ventilation device for the fuel tank of a motor vehicle. One such ventilation device is shown in German Pat. No. DE-AS 20 56 087.

The fuel vapor filter, mostly a charcoal filter has the task of preventing the fuel vapors from escaping into the atmosphere, whereby the HC-molecules are stored in the filter. Since the capacity of the filter is limited, the filter should be frequently cleaned with fresh air during the operation of the combustion engine, which is fed through a filter exhaust line to the combustion engine. Heretofore, in order to insure that the fuel-air mixture is not enriched during idling of the combustion engine, the cross section of the filter exhaust line was dimensioned very small at, least at one point, thereby limiting the amount of the intake fuel vapors from the filter to a level which did not have a detrimental effect on the idling operation of the engine. However, because this reduction in the exhaust line the amount of air passing through the filter was also limited at high rotational speeds, so that the regeneration of the filter was impaired.

It is therefore an object of the present invention to provide a ventilation device of the aforementioned type in which an improved regeneration of the fuel vapor filter is obtained. This object of the invention is solved as described below.

In the device described herein the cross section of the filter exhaust line is increased with the rotational speed of the engine so that the amount of air flowing through the fuel filter is increased correspondingly and the fuel filter is regenerated rapidly without any detrimental effects on the air-fuel mixture ratio to the engine during idling.

Preferably, an electromagnetic valve is provided with a pulsed direct current with a variable pulse width which is dependent on the speed of rotation of the engine. The valve consists of an electromagnet which pulls a slide against the force of a spring when activated by the direct current. If this current is pulsed with a constant frequency the spring-slide system starts to oscillate. The slide opens or closes the filter exhaust line. Therefore variable air passages through the filter exhaust can be obtained by changing the width of the current pulses.

Preferably, the valve is designed to shut off the filter exhaust line completely when the combustion engine is shut off. This prevents the fuel vapors from accumulating in the intake system before the combustion engine is started at high ambient temperatures thereby insuring that the intake air-fuel mixture is not enriched otherwise the starting operation of the engine would be more difficult.

Alternatively, one could provide a shut-off valve in the filter exhaust line which would have the sole purpose of shutting off the exhaust line when the combustion engine is shut off, but which otherwise would be fully opened. For this purpose one could also use an electromagnetic valve which is opened when the engine ignition is activated.

One exemplified embodiment of the invention is described in the following in conjunction with the drawings.

Figure 2:
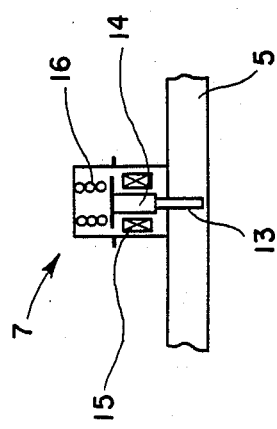

FIG. 1 schematically illustrates the fuel supply system of a vehicle combustion engine with a ventilation device in accordance with the invention; and FIG. 2 illustrates in a sectional schematic view an electromagnetic valve mounted in the filter exhaust line.

A combustion engine 1 of a vehicle is supplied with fuel from a fuel tank 2 by means of a fuel line and a pump (not shown). A ventilation line 3 leads from the fuel tank 2 to the atmosphere by means of a fuel vapor filter 4, which may be, for example, a charcoal filter. The filter 4 prevents fuel vapors from escaping into the atmosphere. The filter 4 is connected through a filter exhaust line 5 to the intake system 6 of the combustion engine 1 for regenerating the filter. When the combustion engine is in operation, air flows through the filter 4 and through line 5 thereby removing fuel captured by filter 4.

In order to prevent enriching the fuel-air mixture fed by the intake system 6 to the combustion engine 1, in particular during its idling operation or during its operation under relatively low load, valve 7 is provided in line 5 which is operated in accordance with the rotational speed of the combustion engine 1 and which shuts off the exhaust line 5 when the combustion engines shut off and which opens the line in accordance with the rotational speed of the engine. Valve 7 is preferably an electromagnetic valve which is supplied with pulsed direct current having a constant frequency, however, with a duration or duty cycle dependent on the speed of rotation of the engine. For this purpose the connecting line 8 of the electromagnet contains an oscillator 11 for generating a pulsed current from the vehicle battery 10. The oscillator modulates the width of the pulse sent to valve 7 in accordance with a rotational speed signal N received from a tachometer (not shown). Furthermore, a switch 12 is provided in line 8 which is open when the engine ignition is switched off.

Valve 7 is schematically shown in an enlarged scale in FIG. 2. It is provided with a shut-off slide 13 which is mounted on an anchor 14 and which is pulled upward in the drawing when current flows through coil 15 in opposite direction to the force of a spring 16. The spring urges the slide 13 toward its closed position in which the slide blocks the filter exhaust line. When the circuit of the coil 15 is interrupted by opening switch 12, the slide 13 is pushed into the closed position by spring 16. This prevents fuel vapors from entering the engine intake system 6 through line 5 when the combustion engine 1 is off, so that the vapor cannot collect therein to make the starting of the engine more difficult, by a severe enrichment of the fuel-air mixture. When the combustion engine is running, e.g., when switch 12 is closed, coil 15 is supplied with pulsed current having a constant frequency, whereby the spring-mass (slide 13, anchor 14) system starts to oscillate so that the exhaust line 5 is alternately closed and opened depending on the current pulse width. The exhaust line 5 is opened in an increasing manner simultaneously with an increased rotational speed of the engine by changing the current pulse width. Above a preselected minimum rotational speed, the valve is completely opened and a sufficiently large amount of air is taken in through filter 14 to effectuate the regeneration thereof.

It is known that the charcoal filter 4 becomes rapidly ineffective when it comes into contact with liquid fuel, so that it is advantageous to provide a separator for liquid fuel in the ventilation line 3 as close as possible to filter 4 or, if need be, to integrate it with the filter. This filter separator may be connected in a suitable manner to exhaust line 5.

Preferably, the separator and filter 4 are advantageously disposed at a location within the engine compartment of the vehicle where they are exposed to the engine heat, so as to accelerate the evaporation of the fuel in the separator or the removal of the fuel vapors from filter 4.

The air which is taken in through filter 4 may be filtered. For example, it may be taken from the air intake system of the combustion engine at a point downstream from the customary air filter 17.

What is claimed is:

1. A ventilation device for the fuel tank of a motor vehicle having a fuel-air mixture intake system, a ventilation line which connects the tank with the atmosphere by means of a fuel vapor filter (4) and a filter exhaust line (5) through which the fuel vapors are sucked from the filter into the intake system of the vehicle, characterized in that an electromagnetic valve (7) is provided which regulates the flow through the exhaust line (5) in accordance with the speed of rotation of the engine and means are provided for generating a pulsed direct current with a changeable pulse width for operating said valve, said pulse width being dependent on the speed of rotation of said engine; said valve being constructed and arranged to permit increased flow through said exhaust line with increased rotational engine speed to clean said fuel vapor filter.

* * * * *